(12) United States Patent
Nishioka et al.

(10) Patent No.: US 7,649,996 B2
(45) Date of Patent: Jan. 19, 2010

(54) CRYPTOGRAPHIC COMMUNICATION APPARATUS

(75) Inventors: Tsuyoshi Nishioka, Tokyo (JP); Hirokazu Ishizuka, Tokyo (JP); Toshio Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/496,368

(22) PCT Filed: Sep. 26, 2002

(86) PCT No.: PCT/JP02/09950
§ 371 (c)(1),
(2), (4) Date: May 21, 2004

(87) PCT Pub. No.: WO2004/030270
PCT Pub. Date: Apr. 8, 2004

(65) Prior Publication Data
US 2005/0157875 A1    Jul. 21, 2005

(51) Int. Cl.
*H04K 1/00* (2006.01)
(52) U.S. Cl. .................................................. 380/255
(58) Field of Classification Search ................. 380/255, 380/277–278, 46, 406; 713/150
See application file for complete search history.

(56) References Cited

U.S. PATENT DOCUMENTS 5,757,912 A * 5/1998 Blow ........................... 380/256
7,035,411 B2   4/2006 Azuma et al.

FOREIGN PATENT DOCUMENTS

| JP | 10-322329 A | 12/1998 |
| JP | 2000-201144 A | 7/2000 |
| JP | 2000-286841 A | 10/2000 |
| JP | 2000-324100 A | 11/2000 |
| JP | 2001-358712 A | 12/2001 |
| JP | 2001-358712 A | 12/2001 |

(Continued)

OTHER PUBLICATIONS

Handbook of Applied Cryptography by A. Menezes, P. van Oorschot, and S. Vanstone, CRC Press, 1996.*

(Continued)

*Primary Examiner*—Emmanuel L Moise
*Assistant Examiner*—Ali S Abyaneh
(74) *Attorney, Agent, or Firm*—Birch, Stewart, Kolasch & Birch, LLP.

(57) ABSTRACT

A qubit generating unit generates a qubit having a predetermined quantum state. A qubit encoding unit performs quantum encoding of the generated qubit. A first pseudo-random number generating unit generates a first pseudo-random number from secretly shared information, which has been secretly shared with the quantum receiving device in advance. A quantum modulator performs quantum modulation of the qubit on which quantum encoding has been performed based on the first pseudo-random number and sends the modulated qubit to the quantum receiving device. A second pseudo-random number generating unit generates a second pseudo-random number from secretly shared information which has been secretly shared with the above quantum sending device in advance synchronously with generation of the above first pseudo-random number. A qubit demodulator performs quantum demodulation of the qubit, which has been received from the quantum demodulator based on the second pseudo-random number,

12 Claims, 6 Drawing Sheets

FOREIGN PATENT DOCUMENTS

| JP | 2002-33730 A | 1/2002 |
|---|---|---|
| JP | 2002-132146 A | 5/2002 |

OTHER PUBLICATIONS

"Implementation of chaotic cryptography with chaotic synchronization" by Rong He and P. G. Vaidya, Physical Review E vol. 57 No. 2, dated Feb. 1998.*

Physical Review a—Atomic, Molecular, and Optical Physics. APS through AIP, vol. 68, No. 5, Nov. 2003, pp. 052307-1-052307-8, XP002307213, "Fast and secure key distribution using mesoscopic coherent states of light," G. A. Barbosa.

Proceedings of the Sixth International Conference on Quantum Communication, Measurement and Computing, Jul. 2002, pp. 1-3, XP002307214 "Secure communication using coherent states," G. Barbosa et al.

IEEE Photonics Technology Letters, vol. 14, No. 4, Apr. 2002, XP001122905, pp. 576-578, "'Circular Type' Quantum Key Distribution," T. Nishioka et al.

Information Security and Privacy Australasian Conference,. ACISP, XX, XX, No. 2119, Aug. 6, 2001, pp. 260-273, XP002957601, "Error Detection and Authentication in Quantum Key Distribution," A. Yamamura et al.

Bennett, Charles H. et al.; "Quantum Cryptography: Public Key Distribution and Coin Tossing;" International Conference on Computers, Systems & Signal Processing; Bangalore India, Dec. 10-12, 1984; pp. 175-179.

Bennett, Charles H. et al.; "Experimental Quantum Cryptography;" Journal of Cryptology; 1992; pp. 3-28.

Bruss, Dagmar; "Optimal Eavesdropping in Quantum Cryptography With Six States;" Physical Review Letters, vol. 81, No. 14; Oct. 5, 1998; pp. 3018-3021.

Lo, Hoi-Kwong; "Proof of Unconditional Security of Six-State Quantum Key Distribution Scheme;" arXiv:quant-ph/0102138 v5; Jul. 12, 2002; pp. 1-9.

Ribordy, Grégoire et al.; "Automated "Plug & Play" Quantum Key Distribution;" Electronics Letters 34, 1998, pp. 2116-2117.

Hwang, Won Young et al.; "Quantum Cryptography Without Public Announcement Bases;" arXiv:quant-ph/9702009 v5, Jul. 12, 1997; pp. 1-4.

Ikeno, Nobuichi et al.; "Gendai Ango Riron;" Institute of Electronics, Information and Communication Engineers, $3^{rd}$ edition, May 20, 1989, pp. 67-73 (partial translation of a related part of the document and the corresponding Japanese pages are attached).

2.1 Quantum Cryptography Scheme Based on Uncertainty Principle.

A. Ambainis, et al., "Private Quantum Channels", 41st Annual Symposium on Foundations of Computer Science, 2000, pp. 547-553.

2.1 Quantum Cryptography Scheme Based on Uncertainty Principle 2001.

Yodai Watanabe et al., "Error correction in quantum key distribution", The Symposium on Cryptography and Information Security (SCIS2002), Lecture Notes on CD-ROM, Japan, Jan. 29, 2002, 4D, Quantum Cryptography (3), 4D-1.

* cited by examiner

US 7,649,996 B2

CRYPTOGRAPHIC COMMUNICATION APPARATUS

TECHNICAL FIELD

This invention relates to a quantum cryptography communication device and a quantum cryptography communication method which share random number information while maintaining privacy by detecting an eavesdropper based on uncertainty principle in quantum mechanics.

BACKGROUND ART

A whole configuration chart in FIG. 5 illustrates conventional techniques represented by quantum cryptography which was first proposed by Bennett and Brassard in 1984 (Document 1: C. H. Bennett and G. Brassard, "Quantum Cryptography: Public Key Distribution and Coin Tossing," in Proc. IEEE International Conference on Computers, Systems, and Signal Processing, Bangalore, India, PP175-179, (1984), and Document 2: C. H. Bennett, F. Bessette, G. Brassard, and L. Salvail, "Experimental Quantum Cryptography," J. Cryptology, pp. 3-28, (1992)), for example.

In FIG. 5, a quantum sending device 100 is a device which sends a ciphertext by using the quantum cryptography, and a quantum receiving unit 200 is a device which receives the ciphertext by using the quantum cryptography. A quantum cryptography communication channel 1 is a communication channel for transmitting a qubit from the quantum sending device 100 to the quantum receiving device 200.

Here, the qubit includes arbitrary two-level states:

$$|0\rangle, |1\rangle.$$

The qubit is a quantum state where even linear superposition of the states $$\alpha|0\rangle + \beta|1\rangle$$

is allowed. Specifically, in quantum cryptography communication field, a polarization state, a phase state, etc. of a photon are often used to represent a state of the qubit.

A classical communication network 2 connects the quantum sending device 100 and the quantum receiving device 200. The classical communication network 2 is a network for performing communication between the both devices in a conventional communication method.

Secretly shared information 3 and secretly shared information 21 are information secretly shared between the quantum sending device 100 and the quantum receiving device 200 in advance. It is an object of the quantum cryptography to share random information which is much larger than the above secretly shared information between the quantum sending device 100 and the quantum receiving device 200 while maintaining the privacy.

A qubit generating means 4 outputs a predefined qubit $$|0\rangle$$

periodically.

A random number generating means 5 outputs a first random number bit.

A random number generating means 6 outputs a second random number bit.

A quantum encoding means X7 performs quantum encoding of the qubit which has been generated by the qubit generating means 4, in accordance with the first random number bit which has been output from the random number generating means 5. The quantum encoding rule will be described below.

When the first random number bit is 0,
an identity transformation:

$$|0\rangle\langle 0|+|1\rangle\langle 1|.$$

When the first random number bit is 1,
an X transformation:

$$|0\rangle\langle 1|+|1\rangle\langle 0|.$$

The X transformation in the above rule is a bit-flip transformation, and an x element in Pauli matrix corresponds to the X transformation.

A quantum modulating means H8 performs quantum modulation of the qubit on which quantum encoding has been performed by the quantum encoding means X7, in accordance with the second random number bit which has been output from the random number generating means 6. The modulation rule will be described below.

When the random number bit is 0,
an identity transformation:

$$|0\rangle\langle 0|+|1\rangle\langle 1|.$$

When the random number bit is 1,
an H transformation:

$$(|0\rangle\langle 0|+|0\rangle\langle 1|+|1\rangle\langle 0|-1\rangle\langle 1|)/\sqrt{2}.$$

The H transformation in the above rule is a Hadamard transformation, and the H transformation corresponds to a base transformation.

As stated above, a protocol for transmitting the qubit using two conjugate bases of +base and ×base is called BB84 protocol. The two conjugate bases of +base and ×base will be described later.

Further, in comparison with the above BB84 protocol where the qubit has been transmitted using two modulation rules of the identity transformation and the H transformation, in six-state quantum cryptography (Document 3: D. Bruss, "Optimal Eavesdropping in Quantum Cryptography with Six States," Phys. Rev. 81, pp. 3018-3021, (1998)), the modulation is performed by using three bases (modulation rules) by adding a phase • Hadamard transformation, $$SH: (|0\rangle\langle 0|+|0\rangle\langle 1|+i|1\rangle\langle 0|-i|1\rangle\langle 1|)/\sqrt{2}$$

to the transformations used for quantum modulation. In this case, the above three base transformations are selected for the second random number which has three values of 0, 1, and 2.

A base exchanging means 9 performs classical communication with the quantum receiving device 200 for the first random number which has been output by the random number generating means 5, and extracts random shared information.

An error correcting means 10 performs the classical communication with the quantum receiving device 200 through the classical communication network 2 for the random shared information which has been output by the base exchanging means 9 and performs error correction.

A classical communication means with authentication 11 is provided so that the base exchanging means 9 and the error correcting means 10 perform the classical communication with the quantum receiving device 200. As explicitly described in Document 1 and Document 2, the secretly shared information 3 is used for authentication by the classical communication means with authentication 11.

A privacy amplifying means 12 amplifies the privacy of the error-corrected random shared information, which has been output from the error correcting means 10.

An eavesdropping detecting means 13 judges whether there has been eavesdropping based on additional information which has been output from the error correcting means 10.

A private key 14 is a key which is output from the privacy amplifying means 12 and shared with the quantum receiving device 200 while the privacy with the quantum receiving device 200 is maintained.

A random number generating means 22 outputs a third random number bit.

A quantum demodulating means H23 performs quantum demodulation for the qubit transmitted through the quantum cryptography communication channel 1, in accordance with the third random number bit which has been output from the random number generating means 22. A demodulation rule will be described below.

When the random number bit is 0,
an identity transformation:

$$|0\rangle\langle 0|+|1\rangle\langle 1|.$$

When the random number bit is 1,
an H transformation:

$$(|0\rangle\langle 0|+|0\rangle\langle 1|+|1\rangle\langle 0|-|1\rangle\langle 1|)/\sqrt{2}.$$

Further, in the six-state quantum cryptography, the demodulation is performed by using three bases by adding a Hadamard • anti-phase transformation, $$HS^{-1}: (|0\rangle\langle 0|-i|0\rangle\langle 1|+|1\rangle\langle 0|+i|1\rangle\langle 1|)/\sqrt{2}$$

to the transformations used for the quantum demodulation. In this case, the above three base transformations are selected for the random numbers which have three values of 0, 1, and 2.

A quantum measuring means 24 performs quantum measurement for the qubit on which quantum demodulation has been performed. As the measuring result,
for qubit $|0\rangle$, "0" is output, and
for qubit $|1\rangle$, "1" is output.

Specifically, in a case that a polarization state of a photon is used as the qubit, it can be easily realized using a polarizing beam-splitter and two photon detectors, for example.

A base exchanging means 25 performs the classical communication with the quantum sending device 100 and extracts the random shared information, with respect to the measuring result which has been output by the quantum measuring means 24 and the third random number which has been output by the random number generating means 22.

An error correcting means 26 performs the classical communication with the quantum sending device 100 and performs error correction, with respect to the random shared information which has been output from the base exchanging means 25.

A classical communication means with authentication 27 is provided for performing the classical communication with the quantum sending device 100 at a time of using the base exchanging means 25 and the error correcting means 26. The secretly shared information 21 is used for authentication with the quantum sending device 100.

A privacy amplifying means 28 amplifies the privacy of the random shared information on which error correction has been performed.

An eavesdropping detecting means 29 judges whether there has been eavesdropping based on additional information which has been output by the error correcting means 26.

A private key 30 is a key which is output from the privacy amplifying means 28 and shared with the quantum sending device 100 while the privacy with the quantum sending device 100 is maintained.

Next, operations will be explained.

A whole process chart in FIG. 6 shows the conventional technique of the quantum cryptography communication method, represented by Document 1 and Document 2.

A whole process can be divided into two large steps, i.e., a large step of quantum cryptography communication (S100) and a large step of classical data processing (S200). The processing on a left side is performed by the quantum sending device 100, and the processing on a right side is performed by the quantum receiving device 200.

The large step of quantum cryptography communication (S100) is a step of transmitting a qubit string from the quantum sending device 100 to the quantum receiving device 200. For each qubit, following six steps (S11-S16) are repeated.

First, in a qubit generating step (S11), the qubit generating means 4 generates a predefined qubit $$|0\rangle$$

periodically.

Next, in a quantum encoding step (S12), the quantum encoding means X7 encodes the generated qubit based on the first random number bit which has been output by the random number generating means 5.

In a quantum modulating step (S13), the quantum modulating means H8 modulates the encoded qubit based on the second random number bit which has been output by the random number generating means 6.

By this modulation, the qubit becomes a modulation bit which has four states

|  | first random number | |
|---|---|---|
|  | 0 | 1 |
| +base | $\|0\rangle$ | $\|1\rangle$ |
| ×base | $(\|0\rangle + \|1\rangle)/\sqrt{2}$ | $(\|0\rangle - \|1\rangle)/\sqrt{2}$ | representing 0 and 1 by two pairs of mutually conjugate bases (+base and ×base).

In a quantum transmitting step (S14), the above modulation bit is transmitted from the quantum sending device 100 to the quantum receiving device 200 through the quantum cryptography communication channel 1.

In a quantum demodulating step (S15), the quantum demodulating means H23 demodulates the transmitted qubit (modulation bit) based on the third random number bit which has been output by the random number generating means 22.

Here, by using a characteristic that if the identity transformation and the Hadamard transformation which have been used in the quantum modulation and the quantum demodulation are repeated twice, the transformation becomes the identity transformation, it can be known that only when the second random number and the third random number are identical and the same transformation is used for the quantum modulation and the quantum demodulation, the quantum encoding is performed, and the quantum demodulation of the qubit on which quantum modulation has been performed is correctly performed.

In a quantum measuring step (S16), the quantum measuring means 24 performs quantum measurement of the qubit on which quantum demodulation has been performed. In the quantum measurement, when the qubit is |0⟩, bit "0" is output, and
when the qubit is |1⟩, bit is "1" is output.

Therefore, only when the quantum demodulation has been correctly performed in the quantum demodulating step (S15), a measurement bit and the first random number bit become identical. When the quantum demodulation has been wrongly performed, the measurement bit becomes identical with the first random number bit only with ½ probability.

As described above, after repeating the six steps of the qubit generating step (S11) through the quantum measuring step (S16) for all of the qubits, the large step of quantum cryptography communication (S100) ends.

In the large step of classical data processing (S200), the following four steps are performed.

First, in a base exchange processing step (S21), base information, second random number bit information and third random number bit information which have been used for the quantum modulation and the quantum demodulation in transmission of the qubit, which has been performed in the large step of quantum cryptography communication (S100), are exchanged between the quantum sending device and the quantum receiving device through the classical communication network 2. At this time, if the exchanged base information is identical, it can be known that the correct quantum modulation and the correct quantum demodulation have been performed. Therefore, only the first random number bit and the quantum measurement bit in transmission of a qubit where the base information is identical, and correct quantum modulation and correct quantum demodulation have been performed are extracted and output as random shared information. Since a half of the base information is not identical, about a half of the qubits which have been transmitted from the quantum sending device 100 to the quantum receiving device 200 becomes invalid. In the six-state quantum cryptography in Document 3, about ⅔ of the transmitted qubits becomes invalid.

In the classical communication used in this step, eavesdropping action can be ignored. However, tampering and spoofing by a third party must be prevented. If the spoofing is allowed, a device owned by an eavesdropper relays in each of the quantum cryptography communication channel 1 and the classical communication network 2 connecting the quantum sending device 100 and the quantum receiving device 200. The device owned by the eavesdropper can act as a false quantum receiving device 200 for the quantum sending device 100 and act as a false quantum sending device 100 for the quantum receiving device 200. Therefore, an attack becomes possible, that a private key is shared respectively between the quantum sending device 100 and the device of the eavesdropper and between the device of the eavesdropper and the quantum receiving device 200, the quantum sending device 100 sends a ciphertext using the key shared in the quantum cryptography communication by regarding the device of the eavesdropper as the appropriate quantum receiving device 200, and the device of the eavesdropper decrypts the ciphertext using the key which has been shared with the quantum sending device 100, encrypts again using the private key which has been shared with the quantum receiving device 200, and sends the ciphertext to the quantum receiving device 200. Therefore, for preventing the tampering and the spoofing by the third party, authentication using the secretly shared information which has been secretly shared in advance between the quantum sending device and the quantum receiving device must be performed.

Generally, in the quantum transmitting step (S14), even if the device of the eavesdropper eavesdrops the transmitted qubit, the device of the eavesdropper cannot always perform correct quantum demodulation as the device of the eavesdropper does not know the base information which has been used for the quantum modulation. If quantum demodulation is carried out wrongly, the transmitted qubit changes to a qubit in a completely different state according to uncertainty principle in the quantum mechanics. Therefore, a trace of eavesdropping remains.

In an error correcting step (S22), the error is corrected based on the random shared information which has been output in the base exchange processing step (S21) while the classical communication which allows the eavesdropping but does not allow the tampering and the spoofing is performed via the classical communication network 2 between the quantum sending device and the quantum receiving device. Therefore, the authentication must be performed using the secretly shared information which has been secretly shared in advance between the quantum sending device and the quantum receiving device. Further, data processing is performed, in which the error correction is performed, however volume of information leaked to the third party is small and the privacy is maintained. At this time, a bit rate and a bit error rate are output as additional information. It is judged if there has been the eavesdropping based on a size, change, etc. of this value.

In a privacy amplification processing step (S23), by adopting a hash function to the error-corrected random shared information, the privacy of the information regarding the information volume is amplified.

In a secretly shared information updating step (S24), the secretly shared information is updated for next quantum cryptography communication using a part of the random shared information of which privacy has been amplified, and remaining random shared information is output as a private key.

Further, a procedure of outputting the random shared information from the above secretly shared information in the conventional cryptography which is not the quantum cryptography will be explained briefly.

In this case, secretly shared information which has been secretly shared in advance between a sending device and a receiving device is used as an encryption key and a decryption key, encryption communication of random information which is larger than the above secretly shared information is performed, by using common key block cryptography, stream cryptography, etc., and the random information is shared while the privacy being maintained.

However, in the conventional cryptography, there is no eavesdropping detecting function. Therefore, if the eavesdropper can perform processing in a sufficiently large computation volume, the eavesdropper can cryptanalyze the random information which has been encrypted. Specifically, in the conventional cryptography, the privacy of the random shared information which has been transmitted is secured only based on the security of the computational volume. Meanwhile, in the quantum cryptography, when the eavesdropping is detected based on the eavesdropping detection function according to the quantum mechanics, the communication is discarded, and processing such as repeating the communication until it is confirmed that there is no eavesdropping is performed, therefore, the privacy is secured based on the security of the information volume of the transmitted qubit for which no eavesdropping is guaranteed.

In the conventional quantum cryptography communication device and communication method, there is a problem that the authentication must be performed in classical communication, using the secretly shared information which has been prepared in advance. Further, there is a problem that the base exchange in which information on the quantum modulation and quantum demodulation is exchanged between the sending device and the receiving device via the classical communication network, must be performed, in order to extract a valid bit from the measurement bit which has been obtained in the quantum communication, and consequently, about a half (about $2/3$ in a case of six-state quantum cryptography) of the qubit strings on which quantum transmission has been performed is lost.

Further, since there is no eavesdropping detecting function in the conventional cryptography, there is a problem that the privacy is threatened depending on processing capacity of the eavesdropper regarding the computation volume.

It is an object of this invention to provide a quantum cryptography communication device and a quantum cryptography communication method which do not require the authentication in the classical communication nor the base exchange and further which can use all of the transmitted qubits for signal transmission while maintaining the security of the transmitted qubit regarding the information volume by the eavesdropping detecting function.

DISCLOSURE OF THE INVENTION

A quantum sending device includes a first pseudo-random number generating unit which generates a first pseudo-random number from secretly shared information which has been secretly shared in advance with a quantum receiving device synchronously with generation of a pseudo-random number performed by the quantum receiving device, a quantum encoding unit which performs quantum encoding of a qubit which has a predetermined quantum state, and a quantum modulator which performs quantum modulation of the qubit on which quantum encoding has been performed by the above quantum encoding unit, based on the above first pseudo-random number.

BEST MODE FOR CARRYING OUT THE INVENTION

Embodiment 1

Figure 1:
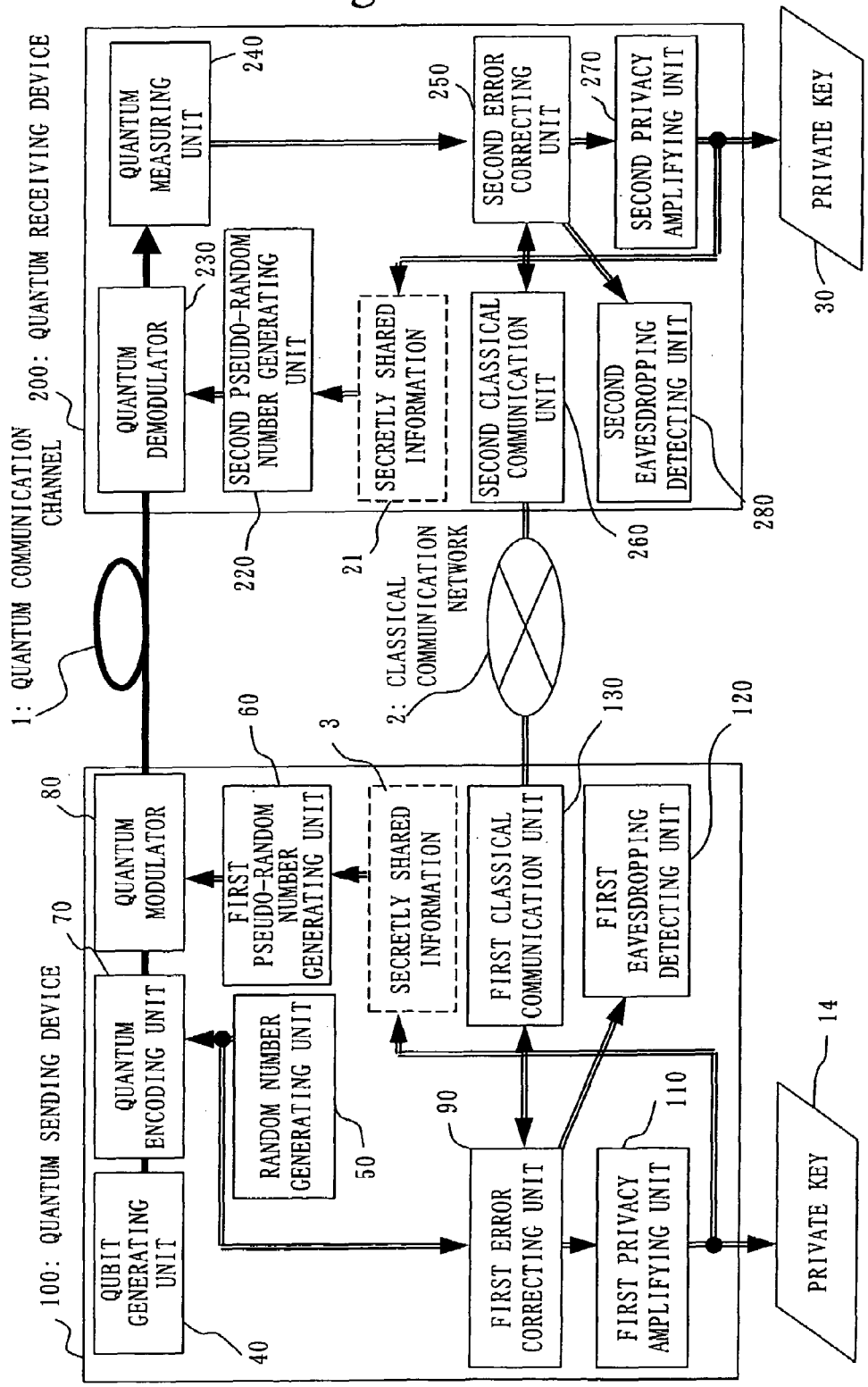
FIG. 1 shows a whole configuration chart of Embodiment 1.

FIG. 1 shows a whole configuration chart of Embodiment 1.

In FIG. 1, the quantum sending device 100 and the quantum receiving device 200 are connected by the quantum cryptography communication channel 1 for transmitting a qubit from the quantum sending device 100 to the quantum receiving device 200.

The classical communication network 2 is a communication network which connects the quantum sending device and the quantum receiving device.

The secretly shared information 3 and the secretly shared information 21 are secret information which have been shared in advance between the quantum sending device and the quantum receiving device.

An internal configuration of the quantum sending device 100 will be explained.

A qubit generating unit 40 outputs a predefined qubit $|0\rangle$ periodically. Here, as the qubit, a polarization state of a photon, which is for qubit $|0\rangle$, horizontal polarization state $|H\rangle$, and for qubit $|1\rangle$, vertical polarization state $|V\rangle$ may be selected. A phase state in a case of having constructed a system of interference may be also selected as the qubit. Further, besides the photon, arbitrary two-level states such as an electron may also be selected.

In a case that the polarization state of the photon has been selected, the stated qubit generating unit 40 can be easily realized by placing a polarizer at an outlet from a light source.

A random number generating unit 50 is a unit which outputs a first random number bit.

A first pseudo-random number generating unit 60 is a unit which outputs a first pseudo-random number bit using the secretly shared information 3 as a seed.

A quantum encoding unit 70 is a unit which performs quantum encoding for the qubit which has been generated by the qubit generating unit 40 based on the first random number bit which has been output from the random number generating unit 50. The encoding rule is that when the random number bit is 0, an identity transformation:

$|0\rangle\langle 0|+|1\rangle\langle 1|$, and when the random number bit is 1, an X transformation:

$|0\rangle\langle 1|+|1\rangle\langle 0|$.

For example, in a case that the polarization state of the photon is selected as the qubit, it can be easily realized by installing a polarizing modulator or a phase modulator so that 45 degree polarization state will be transmitted in TE (TRANSVERSE ELECTRIC POLARIZATION WAVE) mode and by performing ON/OFF based on the first random number bit.

A quantum modulator 80 is a unit which performs quantum modulation for the qubit on which quantum encoding has been performed by the quantum encoding unit 70, based on the first pseudo-random number bit which has been output from the first pseudo-random number generating unit 60. The modulation rule is that when a pseudo-random number bit is 0, an identity transformation:

$|0\rangle\langle 0|+|1\rangle\langle 1|$ and, when a pseudo-random number bit is 1, an H transformation:

$(|0\rangle\langle 0|+|0\rangle\langle 1|+|1\rangle\langle 0|-|1\rangle\langle 1|)/\sqrt{2}$.

The H transformation is a Hadamard transformation, and the H transformation corresponds to the base transformation.

Further, in comparison with the above BB84 protocol where transmission of the qubit has been performed using two conjugate bases, in the six-state quantum cryptography, the modulation is performed by using three bases by adding a phase • Hadamard transformation, $SH: (|0\rangle\langle 0|+|0\rangle\langle 1|+i|1\rangle\langle 0|-i|1\rangle\langle 1|)/\sqrt{2}$ to the transformations used for the quantum modulation. In this case, the above three base transformations are selected for the first random numbers which have three values of 0, 1, and 2. Specifically, the above transformation on the polarization state of the photon can be easily obtained by using the phase modulator, installing the phase modulator so that a TE mode plane of the phase modulator and a horizontal polarization plane in the polarization state will form an appropriate angle, and performing appropriate phase modulation only for the TE mode.

A first error correcting unit 90 is a unit which performs classical communication with the quantum receiving device 200 and performs error correction with respect to the first random number which has been output from the random number generating unit 50. This output becomes the error-corrected random shared information.

A first classical communication unit 130 is a unit which is provided in order for the first error correcting unit 90 to perform the classical communication with the quantum receiving device 200. In this embodiment, the pseudo-random number which is generated from the secretly shared information 3 and the secretly shared information 21 is shared by the quantum sending device 100 and the quantum receiving device 200. Therefore, an authentication function is not necessarily required.

A first privacy amplifying unit 110 is a unit which amplifies the privacy of the error-corrected random shared information.

A first eavesdropping detecting unit 120 is an eavesdropping detecting unit which judges if there has been eavesdropping based on the additional information which is output by the first error correcting unit 90.

The private key 14 is a key which is output from the first privacy amplifying unit 110 and shared while maintaining the privacy with the quantum receiving device 200.

Next, an internal configuration of the quantum receiving device 200 will be explained.

A second pseudo-random number generating unit 220 is a unit which outputs a second pseudo-random number synchronously with the first pseudo-random number generating unit 60 using the secretly shared information 21 as a seed.

A quantum demodulator 230 is a unit which performs quantum demodulation for the qubit which has been transmitted through the quantum cryptography communication channel 1, based on the second pseudo-random number bit which has been output from the second pseudo-random number generating unit 220. The demodulation rule is that when pseudo-random number bit is 0, an identity transformation:

$|0\rangle\langle 0|+|1\rangle\langle 1|$, and when pseudo-random number bit is 1, an H transformation:

$(|0\rangle\langle 0|+|0\rangle\langle 1|+|1\rangle\langle 0|-|1\rangle\langle 1|)/\sqrt{2}$.

Further, in the six-state quantum cryptography, the demodulation is performed by using three bases by adding a Hadamard • anti-phase transformation, $HS^{-1}: (|0\rangle\langle 0|-i|0\rangle\langle 1|+|1\rangle\langle 0|+i|1\rangle\langle 1|)/\sqrt{2}$ to the transformations used for the quantum demodulation. In this case, the above three base transformations are selected for the second pseudo-random numbers which have three values of 0, 1, and 2.

A quantum measuring unit 240 is a unit which performs quantum measurement for the qubit on which quantum demodulation has been performed. As the measurement result, for qubit, $|0\rangle$, "0" is output, and for qubit $|1\rangle$, "1" is output.

A second error correcting unit 250 is a unit which performs the classical communication with the quantum sending device 100 and performs error correction with respect to the measurement result which has been output from the quantum measurement unit 240. This output becomes the error-corrected random shared information.

A second classical communication unit 260 is a unit which is provided in order for the second error correcting unit 250 to perform the classical communication with the quantum sending device 100. The authentication function is not necessarily required like the first classical communication unit 130.

A second privacy amplifying unit 270 is a unit which amplifies the privacy of the error-corrected random shared information.

A second eavesdropping detecting unit 280 is a unit which judges if there has been eavesdropping based on the additional information which is output from the second error correcting unit 250.

The private key 30 is a key which is output from the second privacy amplifying unit 270 and shared while maintaining the privacy with the quantum sending device 100.

Next, an operation will be explained.

Figure 2:
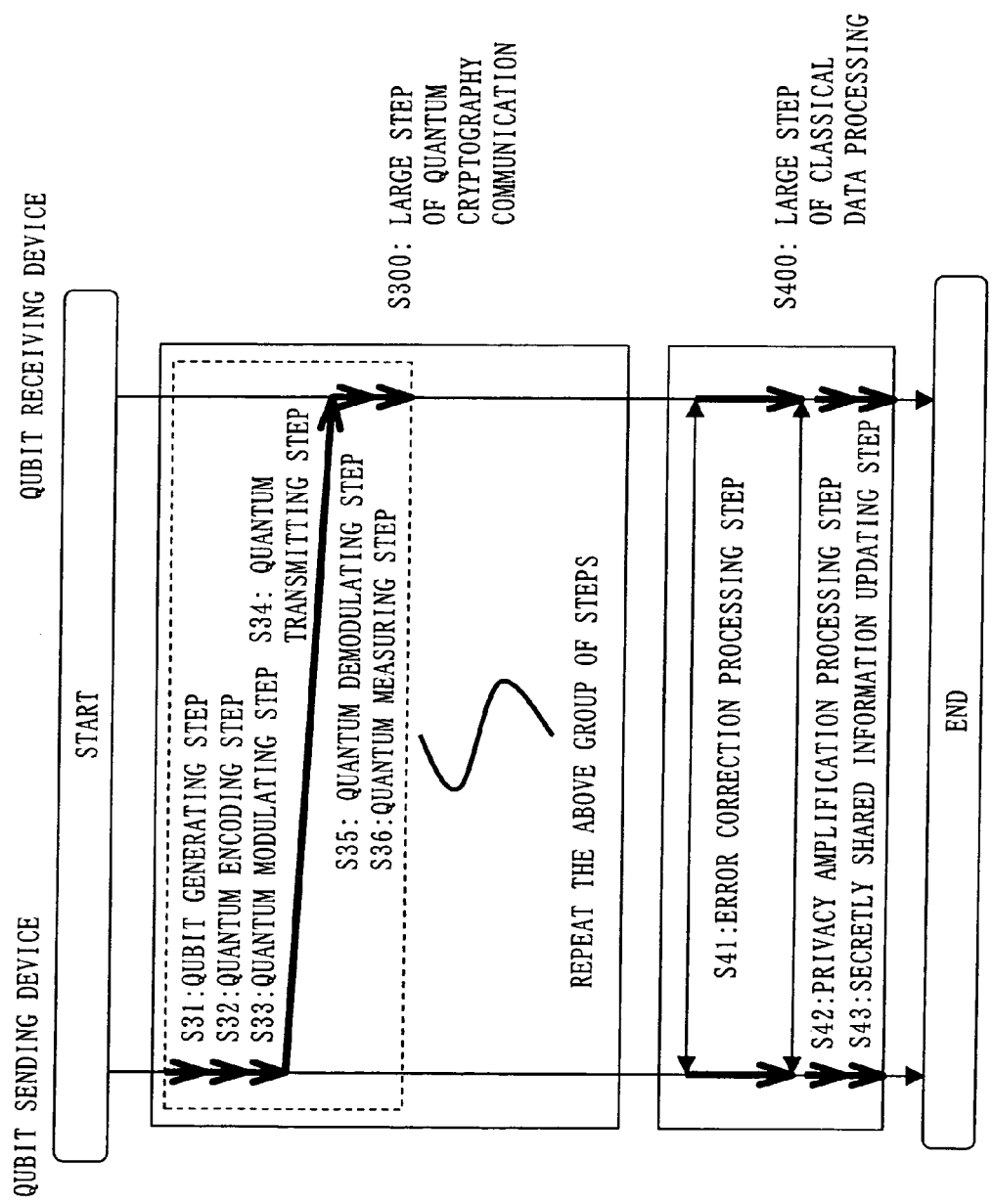
FIG. 2 shows a quantum cryptography communication process of Embodiment 1.

FIG. 2 is a whole process chart.

The whole process can be divided into two large steps, i.e., a large step of quantum cryptography communication (S300) and a large step of classical data processing (S400).

The large step of quantum cryptography communication (S300) is a step of transmitting a qubit string from the quantum sending device to the quantum receiving device. For each qubit, following six steps are repeated.

In a qubit generating step (S31), the qubit generating means 40 generates a predefined qubit $|0\rangle$ periodically.

In a quantum encoding step (S32), the quantum encoding unit 70 encodes the generated qubit based on the random number bit which has been output from the random number generating unit 50.

In a quantum modulating step (S33), the quantum modulator 80 modulates the encoded qubit based on the first pseudo-random number bit which has been output from the first pseudo-random number generating unit 60. By this modulation, the qubit becomes four states representing 0 and 1 by two pairs of mutually conjugate bases.

| | pseudo-random number bit | |
| --- | --- | --- |
| | 0 | 1 |
| +base | $|0\rangle$ | $|1\rangle$ |
| ×base | $(|0\rangle+|1\rangle)/\sqrt{2}$ | $(|0\rangle-|1\rangle)/\sqrt{2}$ |

In a quantum transmitting step (S34), the above modulation bit is transmitted from the quantum sending device 100 to the quantum receiving device 200 through the quantum cryptography communication channel 1.

In a quantum demodulating step (S35), the quantum demodulator 230 demodulates the transmitted qubit based on the second pseudo-random number bit which has been output from the second pseudo-random number generating unit 220.

In this embodiment, the first pseudo-random number bit which has been generated in the quantum modulating step (S33) and the second pseudo-random number bit which has been generated in the quantum demodulating step (S35) are synchronized. Therefore, on the contrary to the conventional art where about ½ (⅔ in the six-state quantum cryptography) of the transmitted qubit strings are invalid, in the quantum cryptography communication method according to this embodiment, the correct quantum demodulation is constantly performed.

In a quantum measuring step (S36), quantum measurement of the qubit on which quantum demodulation has been performed is performed. In the quantum measurement, when the qubit is $|0\rangle$, bit "0" is output, and when the qubit is $|1\rangle$, bit "1" is output.

Therefore, in the quantum demodulating step (S35), the quantum demodulation is always performed correctly. Therefore, as far as turbulence due to noise or an eavesdropping action does not occur to the qubit which is being transmitted, the measurement bit is always identical with the random number bit which has been generated in the quantum encoding step (S32).

After repeating the above six steps of S11 through S16 for all of the qubits, the large step of quantum cryptography communication (S300) ends.

Next, in the large step of classical data processing (S400), the following three steps are performed.

In an error correction processing step (S41), the error is corrected based on the random number bit generated in the quantum encoding step (S32) and the measurement bit measured in the quantum measuring step (S36), while the classical communication which allows eavesdropping is being performed via the classical communication network 2 of the quantum sending device and the quantum receiving device. Even though the error correction is performed, data processing is performed so that the information volume which leaks to the third party is small and the privacy is maintained. At this time, as the additional information, a bit rate and a bit error rate are output. It is judged if there has been eavesdropping based on a size, change, etc. of this value. In a case of this invention, the quantum modulation and the quantum demodulation are performed based on the secretly shared information 3 and the secretly shared information 21 in the large step of quantum cryptography communication (S300).

Therefore, in the classical communication, even if the spoofing and the tampering are allowed, consistent error correction processing is impossible, and the eavesdropper can be detected without failure.

Therefore, as the relay attack which is seen in the conventional art is not possible, the authentication function in the classical communication is not necessarily required.

Further, in a case that the eavesdropper eavesdrops the qubit which is being transmitted in the quantum transmitting step (S34), the eavesdropper cannot forecast the quantum modulation information due to the pseudo-random characteristics. Additionally, due to the random characteristics of the quantum encoding information, it is completely impossible to extract meaningful information from a qubit of which characteristics that the qubit cannot be copied has been proved by the quantum mechanics. Further, the eavesdropping action can be detected from the turbulence which is inevitably caused by the eavesdropping action.

In the privacy amplification processing step (S42), the privacy is amplified in a manner of the information volume by using the hash function to the error-corrected random shared information which has been output from the error correction processing step (S41).

In secretly shared information updating step (S43), the secretly shared information is updated using a part of the random shared information of which privacy has been amplified for next quantum cryptography communication, and remaining random shared information is output as a private key.

As stated, according to this embodiment, a quantum cryptography communication device, in which a detection on eavesdropping based on quantum mechanics is carried out using the quantum communication channel 1 for performing first signal transmission using the quantum states which cannot be mutually observed simultaneously and the classical communication network 2 for performing second classical information data communication, in which the quantum sending device 100 and the quantum receiving device 200 can prevent the tampering and the spoofing in the classical communication using the secretly shared information 3 and the secretly shared information 21 which have been securely maintained in advance, and in which the quantum sending device 100 and the quantum receiving device 200 can share the random data securely and secretly, includes the quantum sending device 100 and the quantum receiving device 200. The quantum sending device 100 includes the qubit generating unit 4 which can constantly generate a qubit in an identical quantum state, the random number generating unit 50 which is a signal source for quantum encoding which is implemented to the qubit, the first pseudo-random number generating unit 60 which treats the secretly shared information 3 as a seed and generates the pseudo-random number from this seed, the quantum encoding unit 70 which performs quantum encoding for the qubit based on the random number which has been output from the random number generating unit 50, a quantum modulator 80 which performs quantum modulation of the qubit based on the pseudo-random number which has been output from the first pseudo-random number generating unit 60, the first error correcting unit 90 which performs error correction while performing the classical communication with the quantum receiving device 200 in maintaining the privacy, a first classical communication unit 130 which performs the classical communication in order to perform the error correction processing with the quantum receiving device 200, the first privacy amplifying unit 110 which amplifies the privacy of the secret information of which error has been corrected, and the first eavesdropping detecting unit 120 which performs eavesdropping based on the additional information which is output in the error correction processing.

Further, the quantum receiving device 200 includes the second pseudo-random number generating unit 220 which treats the secretly shared information 21 as a seed and generates a pseudo-random number from this seed, the quantum demodulator 230 which performs demodulation by performing quantum modulation of the received qubit based on the pseudo-random number which has been output from the second pseudo-random number generating unit 220, a quantum measuring unit which measures the demodulated qubit and outputs a classical bit, the second error correcting unit 250 which performs error correction after the quantum communication finishes while performing the classical communication with the quantum sending device 100 in maintaining the privacy, the second classical communication unit 260 which performs classical communication in order to perform the error correction processing with the quantum sending device 100, a second privacy amplifying unit which amplifies the privacy of the secret information of which error is corrected, and the second eavesdropping detecting unit 280 which detects eavesdropping based on the additional information which is output in the error correction processing.

Further, the quantum cryptography communication method illustrated in this embodiment includes a large step of quantum cryptography communication which repeats for each qubit a group of steps of a generating step for generating a qubit by the qubit generating unit 4, a quantum encoding step for performing quantum encoding for the generated qubit based on the random number bit which is generated by the random number generating unit 50, a quantum modulating step for performing quantum modulation for the qubit on which quantum encoding is performed based on the pseudo-random number bit which is generated by the first pseudo-random number generating unit 60 from the secretly shared information 3 as the seed, a quantum transmitting step for transmitting the qubit on which quantum modulation is performed from the quantum sending device 100 to the quantum receiving device 200 via the quantum communication channel 1, a quantum demodulating step for performing quantum demodulation of the received qubit, and a quantum measuring step for performing the quantum measurement for the qubit on which quantum demodulation is performed, and a large step of classical data processing including a group of steps of an error correction processing step for performing error correction via the classical communication network 2 for the classical data which is obtained as a result of communicating a qubit string, a privacy amplification processing step for performing the privacy amplification by the quantum sending device and the quantum receiving device respectively for the classical data of which error correction is performed, and a secretly shared information updating step for updating a part of the classical data of which privacy amplification is performed as the secretly shared information.

In this embodiment, the quantum modulation and the quantum demodulation are performed based on the pseudo-random number bit which is output synchronously using the secretly shared information as a seed between the quantum sending device and the quantum receiving device. Therefore, the base exchanging unit and the base exchange processing step which exists in the conventional art may be omitted.

Therefore, all of the qubits can be utilized effectively instead of making about ½ (⅔ in the six state quantum cryptography) of the transmitted qubit strings invalid, and high speed characteristics that the bit rate is two times (or three times) of the conventional art can be realized.

Particularly, in the six state quantum cryptography (12.7%) which has higher allowable bit error rate for securing the security compared with BB84 protocol (11%) (Document 4: H.-K. Lo, "Proof of unconditional security of six-state quantum key distribution scheme," quant-ph/0102138 LANL-preprint), transmission efficiency according to the conventional art is as low as ⅓, however, the transmission efficiency according to this invention becomes three times, and the transmission efficiency which is not inferior to the BB84 protocol can be realized.

Further, since the quantum modulation and the quantum demodulation are performed using the secretly shared information which is shared in advance between the quantum sending device and the quantum receiving device, it is equal to that the authentication is performed in the large step of quantum cryptography communication (S300), and it is not required to perform the authentication communication additionally in the large step of classical data processing (S400) unlike the conventional art.

Further, by the eavesdropping detecting function, it is possible to confirm if there has been eavesdropping. Therefore, the security of the transmitted qubit without eavesdropping can be secured regarding the information volume. Hence, it is possible to share the privacy of the very secure random information compared with the conventional cryptography which relies on the security regarding the computation volume.

In this embodiment, the quantum cryptography communication is realized by adopting a polarization state of an arbitrary qubit as an actual example. However, the quantum cryptography communication can be performed by adopting a phase state of an arbitrary qubit.

Embodiment 2

In this embodiment, an embodiment of adopting a phase state of a photon as a qubit and performing the quantum cryptography communication using a Mach-Zehnder interferometer is described.

Figure 3:
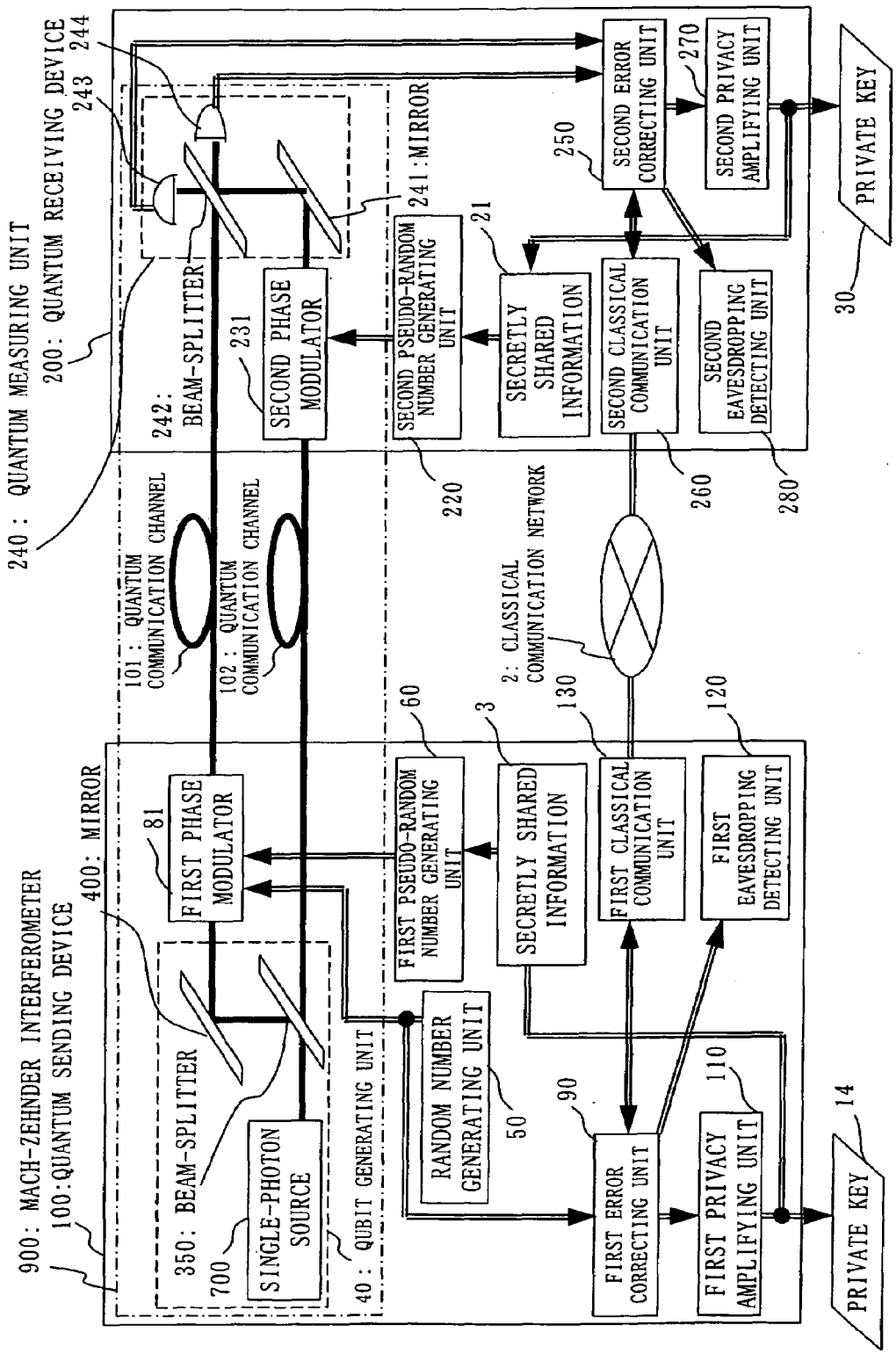
FIG. 3 shows a whole configuration chart of Embodiment 2.

FIG. 3 shows a whole configuration chart of Embodiment 2. A Mach-Zehnder interferometer 900 includes the qubit generating unit 40, a first phase modulator 81, a quantum communication channel 101, a quantum communication channel 102, the quantum measuring unit 240, and a second phase modulator 231. Difference in configuration from Embodiment 1 is the configuration of the qubit generating unit, the quantum encoding unit, the quantum modulator, the quantum communication channel, the quantum demodulator, and the quantum measuring unit.

Below, component parts which are different from Embodiment 1 are explained.

The qubit generating unit 40 includes a single-photon source 700, a beam-splitter 350, and a mirror 400.

A photon which has been output from the single-photon source 700 is split into two optical paths by the beam-splitter 350 and the mirror 400. A state in which the photon is in the upper quantum communication channel 101 is defined as $|u\rangle$ and a state in which the photon is in the lower quantum communication channel 102 is defined as $|l\rangle$, then, a qubit to be generated can be described as $|0\rangle = (|u\rangle + |l\rangle)/\sqrt{2}$.

The first phase modulator 81 corresponds to the quantum encoding unit and the quantum modulator in Embodiment 1. The first phase modulator 81 performs quantum encoding and quantum modulation of the generated qubit based on the first random number bit which is output from the random number generating unit 50 and the first pseudo-random number bit which is output from the first pseudo-random number generating unit 60 so that when the random number bit is 0 and the pseudo-random number bit is 0, $|0\rangle = (|u\rangle + |l\rangle)/\sqrt{2}$, when the random number bit is 1 and the pseudo-random number bit is 0, $|1\rangle = (-|u\rangle + |l\rangle)/\sqrt{2}$, when the random number bit is 0 and the pseudo-random number bit is 1, $|\bar{0}\rangle=(i|u\rangle+|l\rangle)/\sqrt{2}$, and when the random number bit is 1 and the pseudo-random number bit is 1, $|\bar{1}\rangle=(-i|u\rangle+|l\rangle)/\sqrt{2}$.

Quantum transmission of the qubit on which quantum encoding and quantum modulation have been performed to the quantum receiving device 200 is performed through the quantum communication channel 101.

Quantum demodulation of the transmitted qubit is performed by the second phase modulator 231 corresponding to the quantum demodulator in Embodiment 1 based on the second pseudo-random number bit which is output from the second pseudo-random number generating unit 220 which is synchronized with the first pseudo-random number generating unit 60 in accordance with the following rule.

When the pseudo-random number bit is 0,
identity transformation:

$|u\rangle\langle u|+|l\rangle\langle l|$, and when the pseudo-random number bit is 1,
phase transformation S:

$|u\rangle\langle u|+i|l\rangle\langle l|$.

At this time, since the first pseudo-random number bit and the second pseudo-random number bit are identical as stated above, the above qubit on which quantum demodulation has been performed is when the random number bit is 0, $|0\rangle=(|u\rangle+|l\rangle)/\sqrt{2}$, and when the random number bit is 1, $|1\rangle=(-|u\rangle+|l\rangle)/\sqrt{2}$ based on the first random number bit.

In the quantum measuring unit 240 including a mirror 241, a beam-splitter 242, a first photon detector 243, and a second photon detector 244, when the qubit is $|0\rangle$, the first photon detector 243 detects the photon, and when the qubit is $|1\rangle$, the second photon detector 244 detects the photon.

Other configuration besides the above is completely same as Embodiment 1.

As stated, even in a case that the phase state of the photon is adopted as the qubit and the quantum cryptography communication is performed using the Mach-Zehnder interferometer 900, high speed characteristics of the quantum cryptography communication can be realized by omitting the base exchanging unit and the base exchange processing step which exist in the conventional art and by utilizing all of the qubits effectively.

Embodiment 3

In the above embodiments, the qubit generating unit has been provided in the quantum sending device 100. In this embodiment, the system can be realized also with a configuration where the qubit generating unit is provided in the quantum receiving device 200 (document 5: G. Ribordy, J.-D. Gautier, N. Gisin, O. Guinnard, H. Zbinden, "Automated "Plug & Play" Quantum Key Distribution," Electronics Lett. 34, PP. 2116-2117, (1998)).

Figure 4:
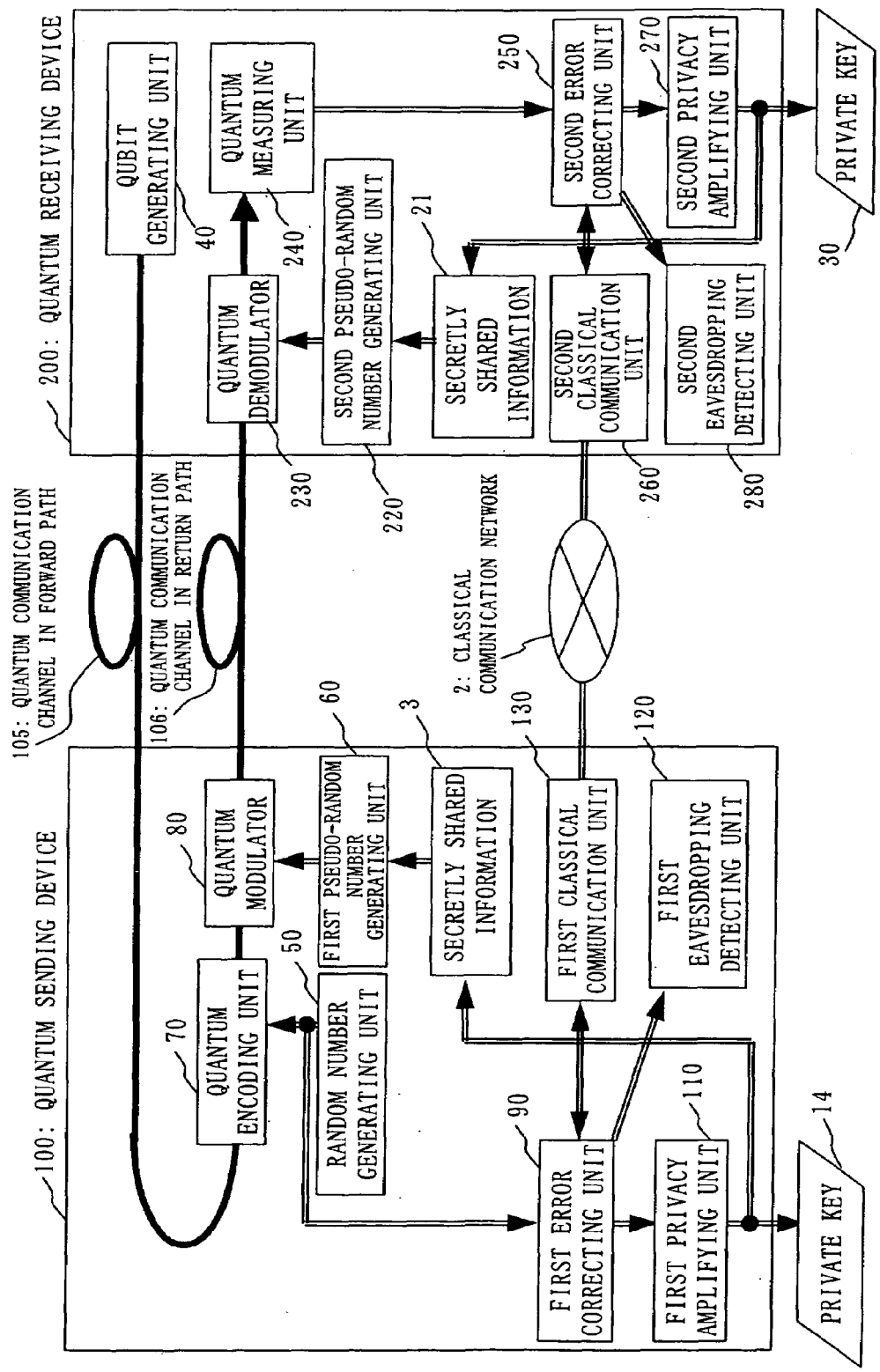
FIG. 4 shows a whole configuration chart of Embodiment 3.
Figure 5:
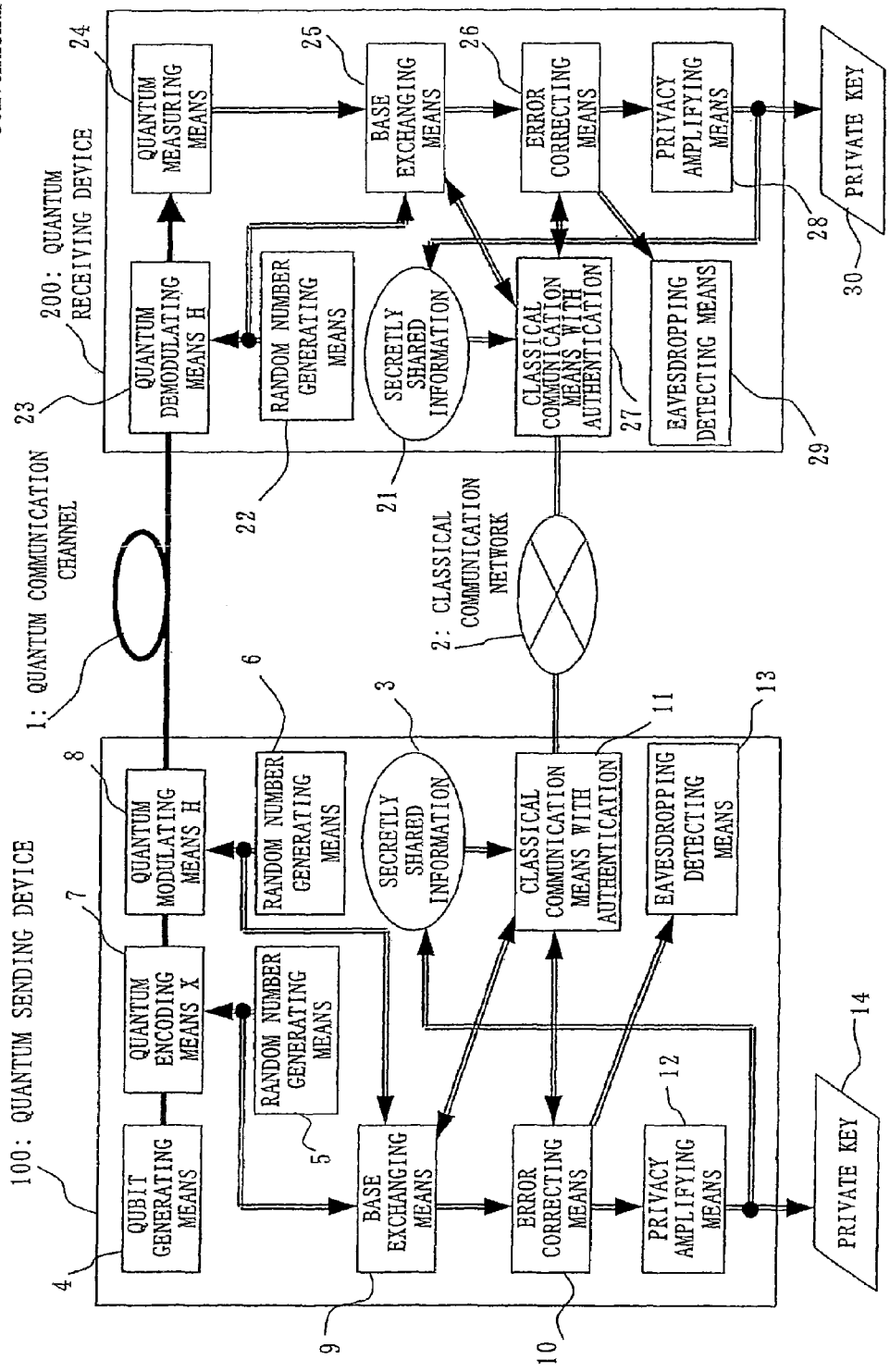
FIG. 5 shows a whole configuration chart of quantum cryptography in conventional art.
Figure 6:
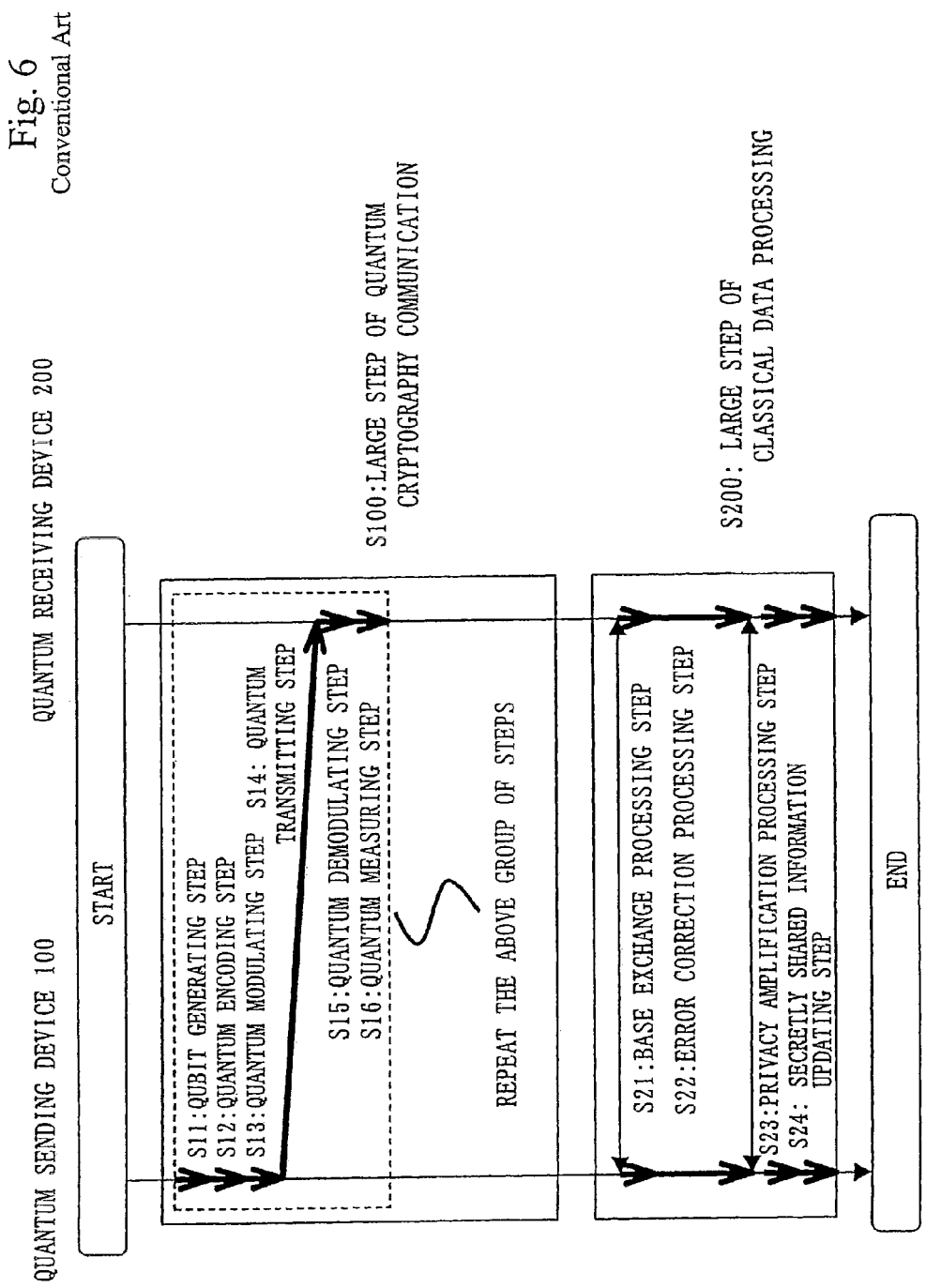
FIG. 6 shows a chart illustrating quantum cryptography communication process in conventional art.

FIG. 4 shows a whole configuration chart of Embodiment 3. In this embodiment, as illustrated in FIG. 4, a forward path and a return path between the quantum sending device and the quantum receiving device are provided respectively as the quantum communication channels (a quantum communication channel in a forward path 105 and a quantum communication channel in a return path 106). However, it is also possible to realize a configuration in which an identical optical path is used as a forward path and a return path by using an optical path control unit such as a beam-splitter, Faraday mirror, etc.

Further, in FIG. 4, the quantum demodulator 230 is provided in the quantum communication channel in the return path 106, however the quantum demodulator 230 may be provided also in the quantum communication channel in the forward path 105.

In this embodiment, a same effect as other embodiments can be realized. Further, by providing the qubit generating unit 40 in the quantum receiving device 200, it is possible to reduce a processing load on the quantum sending device 100.

INDUSTRIAL APPLICABILITY

According to this invention, it is possible to omit the processing of exchanging the bases between the devices.

Further, the qubit can be utilized effectively.

Further, it is possible not to require authentication communication again in the classical communication.

Further, it is possible to share the privacy of the secure random information.

The invention claimed is:

1. A quantum sending device comprising:
   a first pseudo-random number generating unit which generates a first pseudo-random number from secretly shared information which is secretly shared with a quantum receiving device in advance, synchronously with generation of a second pseudo-random number performed by the quantum receiving device;
   a quantum encoding unit which performs quantum encoding of a qubit having a predetermined quantum state; and
   a quantum modulator which performs quantum modulation of the qubit on which quantum encoding is performed by the quantum encoding unit based on the first pseudo-random number.

2. A quantum receiving device comprising:
   a second pseudo-random number generating unit which generates a second pseudo-random number from secretly shared information which is secretly shared with a quantum sending device in advance, synchronously with generation of a first pseudo-random number performed by the quantum sending device; and
   a quantum demodulator to which a qubit having a predetermined quantum state is sent from the quantum sending device and which performs quantum demodulation of the sent qubit based on the second pseudo-random number.

3. A quantum cryptography communication device comprising:
   a quantum sending device which performs quantum encoding, modulation and transmission of a qubit; and
   a quantum receiving device which performs quantum demodulation of the transmitted qubit,
   wherein the quantum sending device includes a first pseudo-random number generating unit which generates a first pseudo-random number from secretly shared information which is secretly shared with the quantum receiving device in advance, a quantum encoding unit which performs quantum encoding of the qubit having a predetermined quantum state, and a quantum modulator which performs quantum modulation of the qubit on which quantum encoding is performed by the quantum encoding unit based on the above-first pseudo-random number and sends the modulated qubit to the quantum receiving device, wherein the quantum receiving device includes a second pseudo-random number generating unit which generates a second pseudo-random number from the secretly shared information which is secretly shared with the quantum sending device in advances synchronously with generation of the first pseudo-random number, and a quantum demodulator which receives the qubit which is sent from the quantum modulator and performs quantum demodulation of the received qubit based on the second pseudo-random number.

4. The quantum receiving device as defined in claim 3, further comprising a quantum measuring unit which measures the qubit on which quantum demodulation is performed by the quantum demodulator and outputs a measuring result.

5. The quantum cryptography communication device as defined in claim 4, wherein the above-quantum sending device further includes a first classical communication unit which receives the measuring result which is output by the quantum measuring unit and a first error correcting unit which performs error correction of the qubit on which quantum encoding is performed by the quantum encoding unit based on the measuring result which is received by the first classical communication unit, wherein the quantum receiving device further includes a second classical communication unit which receives the qubit on which quantum encoding is performed by the quantum encoding unit, and a second error correcting unit which performs error correction of the measuring result which is output by the quantum measuring unit based on the qubit which is received by the second classical communication unit.

6. The quantum cryptography communication device as defined in claim 5, wherein the first classical communication unit communicates with the quantum receiving device without authenticating the quantum receiving device, wherein the second classical communication unit communicates with the quantum sending device without authenticating the quantum sending device.

7. The quantum cryptography communication device as defined in claim 3, comprising a qubit generating unit which generates a qubit in a predetermined period in either one of the quantum sending device and the quantum receiving device, wherein in a case that the qubit generating unit is provided in the quantum receiving device, the qubit generating unit sends the generated qubit to the quantum encoding unit, wherein the quantum encoding unit performs quantum encoding of either one of the qubit which is generated by the qubit generating unit and the qubit sent by the qubit generating unit.

8. The quantum cryptography communication device as defined in claim 7, wherein the quantum receiving device further includes a quantum measuring unit which measures the qubit on which quantum demodulation is performed by the quantum demodulator and outputs a measuring result, wherein the qubit generating unit, the quantum modulator, the quantum demodulator, and the quantum measuring unit are configured by Mach-Zehnder interferometers in the quantum cryptography communication device.

9. A quantum cryptography communication method comprising:

performing quantum encoding of a qubit having a predetermined quantum state;

generating a first pseudo-random number from secretly shared information which is secretly shared in advance;

performing quantum modulation of the qubit on which quantum encoding is performed based on the generated first pseudo-random number;

transmitting the qubit on which quantum modulation is performed;

generating a second pseudo-random number from the secretly shared information which is secretly shared in advance synchronously with generation of the first pseudo-random number; and performing quantum demodulation of the qubit which is transmitted based on the second pseudo-random number which is generated.

10. The quantum cryptography communication method as defined in claim 9, further comprising:

measuring the qubit on which quantum demodulation is performed, sending a measuring result;

performing error correction of the qubit on which quantum encoding is performed based on the measuring result which is sent;

sending the qubit on which quantum encoding is performed; and performing error correction of the measuring result based on the qubit which is sent.

11. A quantum sending device comprising:

a first pseudo-random number generating unit being configured to generate a first pseudo-random number from secretly shared information which is secretly shared with a quantum receiving device in advance synchronously with generation of a second pseudo-random number performed by the quantum receiving device, a quantum encoding unit being configured to perform quantum encoding of a qubit being selected as an arbitrary two-level state such as a photon or an electron and having a predetermined quantum state;

a quantum modulator being configured to perform quantum modulation of the qubit on which quantum encoding is performed by said quantum encoding unit based on said first pseudo-random number;

a first classical communication unit provided to perform classical communication with the quantum receiving device via a classical communication network and being configured to receive a measuring result output by a quantum measuring unit of the quantum receiving device, the quantum measuring unit being configured to measure the qubit on which quantum demodulation is performed by a quantum demodulator of the quantum receiving device and to output the measuring result; and a first error correcting unit being configured to perform error correction of the qubit on which quantum encoding is performed by said quantum encoding unit based on the measuring result which is received by said first classical communication unit, wherein said first classical communication unit is configured to communicate with said quantum receiving device without authenticating said quantum receiving device.

12. A quantum receiving device comprising a second pseudo-random number generating unit being configured to generate a second pseudo-random number from secretly shared information which is secretly shared with a quantum sending device in advance synchronously with generation of a first pseudo-random number performed by the quantum sending device;

a quantum demodulator to which a qubit being selected as an arbitrary two-level state such as a photon or an electron and having a predetermined quantum state is sendable from the quantum sending device and being configured to perform quantum demodulation of the sent qubit based on said second pseudo-random number;

a quantum measuring unit being configured to measure the qubit on which quantum demodulation is performed by said quantum demodulator and being configured to output a measuring result;

a second classical communication unit provided to perform classical communication with the quantum sending device via a classical communication network and being configured to receive the qubit on which quantum encoding is performed by a quantum encoding unit of the quantum sending device being configured to perform quantum encoding of the qubit;

and a second error correcting unit being configured to perform error correction of the measuring result which is output by said quantum measuring unit based on the qubit which is received by said second classical communication unit, wherein said second classical communication unit is configured to communicate with said quantum sending device without authenticating said quantum sending device.

* * * * *